(12) United States Patent
Schiek et al.

(10) Patent No.: US 10,460,186 B2
(45) Date of Patent: Oct. 29, 2019

(54) ARRANGEMENT FOR CREATING AN IMAGE OF A SCENE

(71) Applicant: Robert Bosch GmbH, Stuttgart (DE)

(72) Inventors: Ulrich Schiek, Hannover (DE); Philipp Ibele, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/101,541

(22) PCT Filed: Nov. 19, 2014

(86) PCT No.: PCT/EP2014/074980
§ 371 (c)(1),
(2) Date: Jun. 3, 2016

(87) PCT Pub. No.: WO2015/082215
PCT Pub. Date: Jun. 11, 2015

(65) Prior Publication Data
US 2016/0307056 A1    Oct. 20, 2016

(30) Foreign Application Priority Data

Dec. 5, 2013   (DE) .......................... 10 2013 224 962

(51) Int. Cl.
*G06K 9/00*     (2006.01)
*B60K 37/06*    (2006.01)
(Continued)

(52) U.S. Cl.
CPC .......... *G06K 9/00845* (2013.01); *B60K 37/06* (2013.01); *B60R 1/00* (2013.01);
(Continued)

(58) Field of Classification Search
CPC ............ B60K 37/06; B60K 2350/1052; B60K 2350/2013; B60K 2350/908; B60K 35/00;
(Continued)

(56) References Cited

U.S. PATENT DOCUMENTS 5,515,130 A    5/1996 Tsukahara et al.
5,689,241 A  * 11/1997 Clarke, Sr. ............... A61B 5/18
                                              340/575
(Continued)

FOREIGN PATENT DOCUMENTS

CN    102490646 A     6/2012
CN    102034334 B   * 12/2012
(Continued)

OTHER PUBLICATIONS

International Search Report dated Apr. 22, 2015, of the corresponding International Application PCT/EP2014/074980 filed Nov. 19, 2014, 3 pages.

*Primary Examiner* — Mekonen T Bekele
(74) *Attorney, Agent, or Firm* — Norton Rose Fulbright US LLP; Gerard Messina

(57) ABSTRACT

To enable a user who is moving through or past a scene, e.g., along a path through a landscape or surrounding environment, and who wishes to record an image thereof, and to acquire or keep images of interest to the user without separate actuations or handling of the named type, a system is provided for producing at least one image of the scene, having at least one device for recording the at least one image, a device for acquiring a behavior of at least one user, a control unit for evaluating the behavior of the at least one user and for obtaining therefrom at least one control signal for a controlling of the device, including a selection of a recording direction and of image segments or objects that are to be recorded, for recording the at least one image in accordance with the behavior of the at least one user.

16 Claims, 1 Drawing Sheet

(51) Int. Cl.
   *B60R 1/00* (2006.01)
   *G06F 3/01* (2006.01)
   *G02B 27/00* (2006.01)
   *B60K 35/00* (2006.01)

(52) U.S. Cl.
   CPC ......... *G02B 27/0093* (2013.01); *G06F 3/012* (2013.01); *G06F 3/013* (2013.01); *B60K 35/00* (2013.01); *B60K 2370/146* (2019.05); *B60K 2370/151* (2019.05); *B60K 2370/21* (2019.05); *G03B 2213/025* (2013.01); *G06F 3/017* (2013.01)

(58) Field of Classification Search
   CPC ...... B60R 1/00; G02B 27/0093; G02B 7/003; G02B 7/287; G06F 3/012; G06F 3/013; G06F 3/017; G06K 9/00845; G03B 2213/025
   See application file for complete search history.

(56) References Cited

U.S. PATENT DOCUMENTS

| | | | | |
|---|---|---|---|---|
| 6,614,469 | B1* | 9/2003 | Kato | G05D 1/0246 348/148 |
| 7,199,767 | B2* | 4/2007 | Spero | G02B 5/20 345/7 |
| 2003/0169213 | A1* | 9/2003 | Spero | G02B 5/20 345/7 |
| 2006/0208169 | A1* | 9/2006 | Breed | B60N 2/002 250/221 |
| 2008/0073889 | A1* | 3/2008 | Nakao | B60R 21/2338 280/730.2 |
| 2008/0186701 | A1* | 8/2008 | Omi | G06K 9/00604 362/231 |
| 2009/0268025 | A1* | 10/2009 | Hiramaki | B60R 1/00 348/148 |
| 2009/0279786 | A1* | 11/2009 | Kasugai | G01B 11/03 382/195 |
| 2010/0023218 | A1* | 1/2010 | Hayakawa | B60W 10/06 701/42 |
| 2010/0030434 | A1* | 2/2010 | Okabe | A61B 5/165 701/48 |
| 2012/0154684 | A1* | 6/2012 | Luo | G11B 27/034 348/700 |
| 2012/0215403 | A1* | 8/2012 | Tengler | B60W 50/12 701/36 |
| 2012/0294478 | A1 | 11/2012 | Publicover et al. | |
| 2014/0139655 | A1* | 5/2014 | Mimar | G08B 21/06 348/77 |
| 2014/0218565 | A1* | 8/2014 | Miyoshi | H04N 5/91 348/231.99 |
| 2014/0292695 | A1* | 10/2014 | Wakamoto | G06F 3/1423 345/173 |
| 2015/0313530 | A1* | 11/2015 | Kodra | G16H 50/70 382/170 |
| 2016/0004321 | A1* | 1/2016 | Takada | G02B 27/01 345/156 |
| 2016/0196098 | A1* | 7/2016 | Roth | B60Q 9/00 715/761 |
| 2016/0267336 | A1* | 9/2016 | Niem | G06T 7/80 |
| 2017/0076597 | A1* | 3/2017 | Beattie, Jr. | B60K 35/00 |
| 2019/0111844 | A1* | 4/2019 | Suzuki | B60R 1/00 |

FOREIGN PATENT DOCUMENTS

| | | |
|---|---|---|
| CN | 102914932 A | 2/2013 |
| DE | 10024227 A1 | 12/2001 |
| EP | 2112547 A2 | 10/2009 |
| JP | 2009237623 A * | 10/2009 |
| KR | 20120062541 A | 6/2012 |
| KR | 20140125596 A | 10/2014 |
| WO | WO2014198552 A1 | 12/2014 |

* cited by examiner

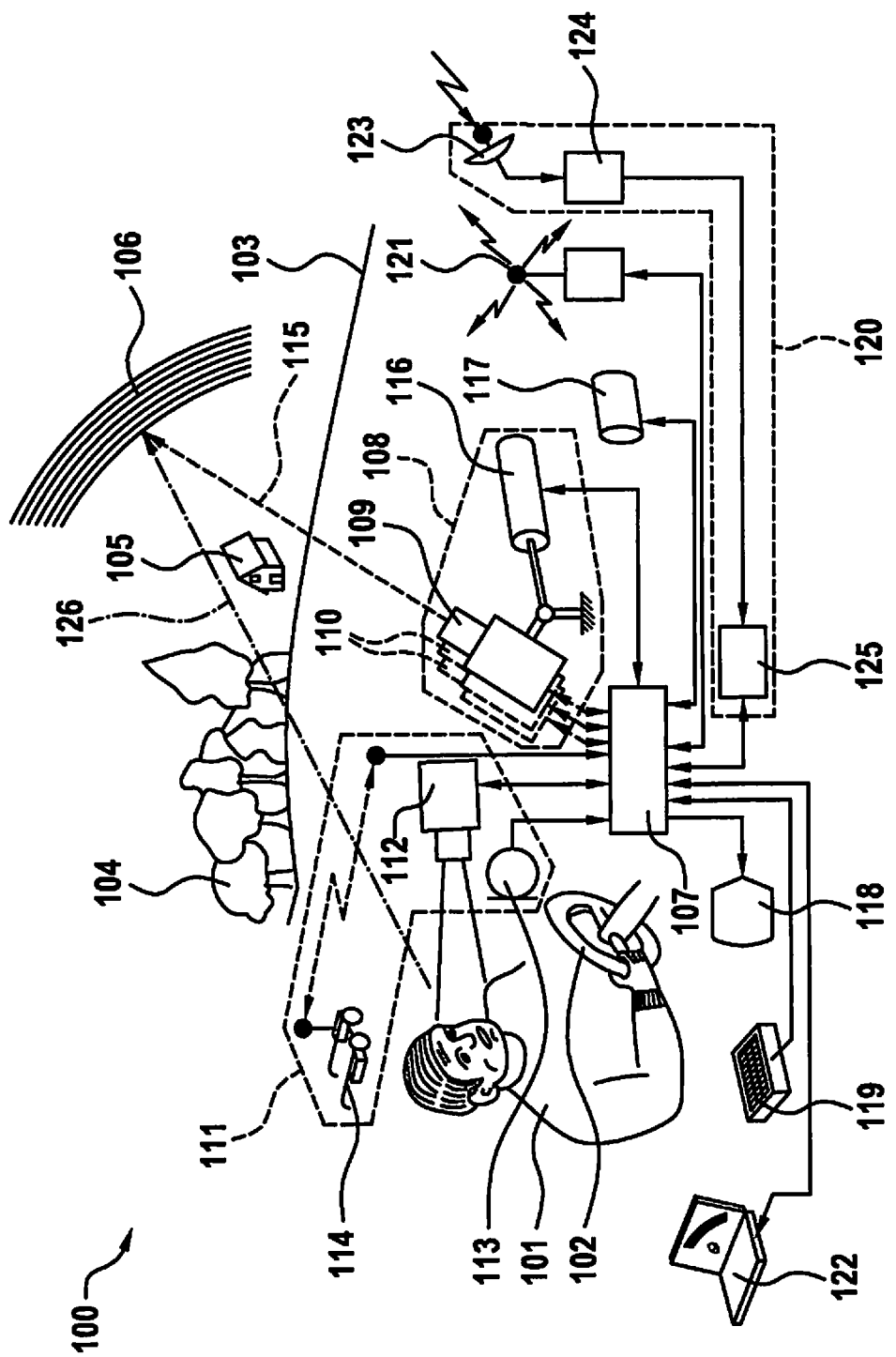

ARRANGEMENT FOR CREATING AN IMAGE OF A SCENE

BACKGROUND INFORMATION

German Patent Application No. DE 100 24 227 B4 describes a method and a device for the electronic monitoring of the degree of attention of a vehicle driver, through electronic monitoring of the eyes and of eyelid activity, and, given electronic registering of tiredness, an alarm signal is generated and the speed is automatically reduced. The direction of view of the driver is acquired and evaluated, tiredness and the direction of view being determined in accordance with a pattern comparison method. A method is also described for monitoring the eyes and eyelid activity of motor vehicle drivers in which an ADR-regulated, automatically controlled column or congested driving mode evaluates, as an additional parameter, the attentiveness and direction of view of the motor vehicle driver using electro-optical eye and eyelid observation. When driving behind another driver, in situations in which the driver in front departs from the lane due to inattentiveness, or due to a technical defect, or in a manner not appropriate to the situation, an automatic following of this relevant vehicle is suppressed in that the view of the motor vehicle driver, directed straight ahead, is also evaluated as a corrective. There takes place here a corresponding engagement in the electronic gas pedal actuation and/or the electronic or electric braking system, and/or in an electronic or electric steering actuation. In this way, a vehicle driver is, if warranted, capable of controlling the vehicle automatically, through correction or corresponding direction of view and direction of view evaluation. Overall, traffic situations that arise due to inattentiveness, and not only due to sleepiness, should remain capable of being under control, in particular if the vehicle is moving in a column of traffic with short distances from the vehicle in front.

European Patent Application No. EP 1 211 132 B1 describes a system for monitoring the environment surrounding a vehicle using a camera operating in a wide-angle range, an image processing unit that has means for equalizing the images recorded by the camera, and an image display unit, the equalizing means operating adaptively on the basis of a selected image segment, and the equalizing means operating adaptively on the basis of a selected direction of view. Also described is a method for monitoring the environment surrounding the vehicle, having the steps: acquisition of a wide-angle range using a camera, equalization of the images recorded by the camera in an image processing unit, and displaying of at least one image using an image display unit. The equalizing takes place on the basis of an image segment and a direction of view, adaptively selected automatically in particular when reverse gear is engaged or according to the image content, the steering angle, the speed, or the angle of inclination of the camera, or quasi-manually by an operator, in particular a driver.

A user who is moving through or past a scene, e.g., along a route through a landscape or environment, and who wishes to record this in an image, must for this purpose actuate a device for acquiring an image of this scene. Such an actuation or handling is however not possible in many situations, or is possible only with serious disadvantages, for example if the user cannot interrupt his movement at an arbitrary location, or for an arbitrary span of time, as is the case for example when moving in a vehicle or in a situation in which the user, for other reasons, has no remaining time to take the relevant image.

SUMMARY

An object of the present invention is to make it possible for a user to acquire or keep images of a scene that are of interest to the user, in a purposive manner, while overcoming the disadvantages described above and without special actuations or handling of the type named above.

This object may be achieved by an example system for creating at least one image of a scene, having at least one device for recording the at least one image, referred to in the following as a camera, a device for acquiring a behavior of at least one user, referred to in the following as acquisition device, and a control unit for evaluating the behavior of the at least one user and for obtaining therefrom at least one control signal for a controlling of the device, including a selection of a recording device and of image segments or objects that are to be recorded, for recording the at least one image in accordance with the behavior of the at least one user. The behavior of a user or of a plurality of users can be acquired selectively or in alternating fashion or at the same time. For the sake of brevity, the general concept of "the user" is used for this in the following. A scene can here be any view or any event that the user perceives or can perceive.

Here, the at least one image, or for short the image, is understood as a photographically recorded individual image, an image sequence, a video sequence, or the like. As device for recording this image, i.e., as camera in the sense described above, optionally a plurality of cameras may also be used, e.g., single-image cameras or video cameras with which images can be recorded in alternating fashion or at the same time as desired. The behavior of the user here refers to actions and/or reactions of the user in various situations or to various events, i.e., all actions and movements of the user, in particular including also looking or directions of view. In contrast, the behavior of the user is not primarily considered to include actions and movements that are typical or standard operating movements or gestures, such as the actuation of buttons, rotating knobs, or the like. According to the present invention, the controlling of the recording of the image primarily takes place through actions that are not randomly carried out by the user, i.e., non-random behavior, and a central feature of the present invention is based on the acquisition and evaluation of this non-random behavior. In addition, consonant with this, random behavior of the same type is also acquired. The control unit is designed to be specifically adapted to evaluate the above-described behavior of the user. Thus, the control unit is set up for the targeted evaluation of behavior that is to be designated as non-random in this way, and to obtain therefrom the at least one control signal for controlling the camera. This controlling includes a selection of a recording direction, i.e., the direction in which a center of an image segment or object to be recorded is seen from the camera, as well as a selection of the size of the image segments or objects to be recorded. Advantageously, the control unit further includes a device for processing, e.g., equalizing, the image, or also a device for selecting an image or a plurality of images from a plurality of recorded images according to selection criteria that can be specified. Thus, through the system according to the present invention the recording of the image takes place automatically through continuous automatic evaluation of the behavior of the user.

The present invention makes it possible for the user automatically to record images of scenes that are important or that seem important to the user, i.e., views or events. Awkward or time-consuming, in particular manual, operation of a camera is no longer required. For example, during a trip in a vehicle in which the system according to the present invention is also traveling, the user does not first have to stop in order to record an image, which in certain traffic situations is not possible, or is possible only too late, or for which the user may not have the time. Through the system according to the present invention an image can also be recorded in situations in which the user has not yet recognized the necessity thereof; e.g., through the system according to the present invention a certain reaction of the user to an appearance of a scene is evaluated as a desire to record an image thereof even before the user has made a final decision about this, and the relevant image is recorded. Through the system according to the present invention the user automatically obtains images, that is for example photos or video sequences, and thus mementos of scenes that are interesting to the user, i.e., views or events. In this way, the risk of an accident is reduced, for example during travel in a vehicle. To record an image, it is then sufficient for example that the user direct his view attentively for a certain time duration to the scene that is to be recorded. The acquisition device acquires this action, i.e., head position and/or eye position, and the named duration. In the control unit this is evaluated as a desire to record an image, and a corresponding control signal is obtained. With this, the recording device and the image segment to be recorded in the camera are set in accordance with a direction of view of the user obtained from the head position and/or eye position, and the image is automatically recorded with these settings. In a comparable manner, any other actions of the user can also be evaluated individually or in combination, and an assignment of the actions to control signals to be obtained therefrom can be defined as desired. The system according to the present invention can thus be used very powerfully and flexibly.

According to a preferred development of the system according to the present invention, the device for acquiring the behavior of the at least one user is fashioned having at least one optical acquisition device and/or at least one acoustic acquisition device and/or at least one position acquisition device. As such an optical acquisition device, for example an observation camera is provided with which the user can at least partly be acquired, preferably eyes and face, but also for example hands, and movements or gestures thereof. The acoustic acquisition device is advantageously equipped with at least one microphone for recording vocalizations but also speech commands of the user. The position acquisition device preferably includes at least one position sensor and/or direction sensor, in particular fashioned to ascertain a head position of the user. Particularly preferably, the acquisition devices indicated above are situated in a set of data glasses that includes position and directional sensor or sensors for the head position, an observation camera for e.g., the eye position, and microphone. For use in a vehicle, the optical acquisition device is preferably fashioned with an interior compartment camera and the acoustic acquisition device is fashioned with a microphone in the instrument panel. A combination of the above embodiments is also possible. In a modified use for emergency personnel, preferably firefighters, the listed acquisition devices are integrated in a helmet, and in this way an automatic documentation of a sequence of events of use is advantageously immediately possible without burdening the emergency personnel with additional tasks to be carried out, or hindering them in their activity.

In a further preferred specific embodiment of the system according to the present invention, the control unit is fashioned to ascertain and/or evaluate an arbitrary number and/or combination of at least the following features of the behavior of the at least one user, referred to simply as the user in the following: a duration and a direction of view of the user, a pupil size and/or a change over time of this pupil size of the user, a facial expression of the user, a vocalization and/or speech expression of the user, a gesture of the user. During the evaluation of these features, advantageously a weighting takes place at the same time. A preferred criterion is for example the direction of view of the user. In particular a deviation of the direction of view from a direction of movement of the user, for the ascertaining of which explanations are given below, is an important criterion, because such a turning away of the view from a direction of a path followed by the user is evaluated as a reliable indication that a scene is located there that the user regards as being worth the recording of an image. Here, preferably also the duration of such a diversion of the view is to be evaluated. For the recognition and evaluation of the direction of view and the pupil size, means for pattern recognition are preferably available in the control unit. Similarly, means for a gesture recognition, for example for body, arm, or hand gestures, are also provided, as well as in addition means for sound or speech recognition. The means for pattern recognition are also used to evaluate the facial expression.

With such a realization of the control unit, it is for example recognized that the user has, multiple times, directed his view in interested fashion to a scene, e.g., a building, situated lateral to his direction of movement, for a duration exceeding a specifiable boundary value. From the recognition of the duration, the frequency, the direction of view and diversion of view, and the interest or attentiveness, via time measurements, movement and view direction determinations, and pattern recognition of the facial expression and in particular the eyes, and a pupil size evaluated for example as a measure of the attentiveness of the user, the control unit carries out an evaluation of the scene in the direction of view as worthy of recording, and automatically triggers a recording by the camera.

In an advantageous development, the system according to the present invention is characterized by a storage device, in the following referred to as memory, for storing at least a selection of the recorded images. This memory is advantageously connected to the control unit and is fashioned to optionally store all the images recorded by the camera or a selection of these images determined by the control unit.

A further preferred specific embodiment of the system according to the present invention is characterized by a display unit for displaying at least a selection of the recorded images. In this way, immediately after actuating the recording, or preferably at a later time, the user can view the images created in the meantime by the system and/or can initiate a processing such as an equalization etc. The display unit is advantageously connected to the control unit.

In addition, the display unit can advantageously be used to display operating procedures for the control unit, preferably in cooperation with a preferred development of the system according to the present invention according to which an operating unit for operating the system by inputting operating commands to the control unit is provided and is preferably connected to the control unit. The operating unit can preferably be used for the manual, individual, later post-processing of the recorded and stored images, and for operating the control unit for setting and/or programming processes of the system.

In a further preferred specific embodiment of the system according to the present invention, a connection is formed to a navigation unit that is set up to determine a position and/or direction of movement of the at least one user, or the user for short, and to communicate the determined position and/or direction of movement to the control unit for the selection of an image to be recorded and/or for linkage to at least a selection of the recorded images. Advantageously, here the navigation unit is also connected to the control unit. Data that are outputted by the navigation unit and that describe the position or direction of movement of the user are thus linked as a common data set to the associated images for their identification during a later calling of these images; i.e. they are stored together. Preferably, for the images a time of recording or camera settings or the like can also be stored. The data supplied by the navigation unit can be evaluated by the control unit in addition to the above-listed features of the behavior of the user and/or in combination with these features in order to select a recording of an image. Optionally, for the determination of the position and/or direction of movement of the user, instead of or in combination with the navigation unit at least one movement sensor and/or direction sensor can also be used, e.g. a compass system, a path recording system, or the like. Preferably, here the data supplied by the navigation unit and the at least one movement sensor and/or direction sensor, describing the position or the direction movement of the user, are supplemented.

A further development is characterized by a use and/or an accommodation of the system according to the present invention in a vehicle, the driver and/or passengers of the vehicle being the at least one user, or the user for short.

In this preferred form of use or embodiment, the system according to the present invention is advantageously fixedly installed in the vehicle, and is integrated into a control network present there, or provided for further control purposes for the vehicle. This holds in particular for the control unit, the interior compartment camera, the device for recording this image, i.e., the camera, here preferably fashioned as an external camera on the vehicle, the microphone, and the data glasses, which, apart from the system according to the present invention, can also be used for other tasks in the vehicle. In this way, the overall additional apparatus outlay for the system according to the present invention can be kept very low.

A further preferred embodiment of the system according to the present invention is characterized by a connection to a transmission unit for transmitting at least a selection of the acquired images to and/or via a communication network. Through this combination with the transmission unit, the recorded images are optionally or additionally capable of being supplied for storage in the above-described memory of the communication network, e.g., an email connection, a social network, or a central memory device outside the system according to the present invention, and for example can be sent to further communication participants or can be stored outside the system according to the present invention, e.g., in a so-called "cloud," i.e., for example a central memory, reachable via a communication network, of a service provider of the communication network, or the like.

According to an advantageous development of the system according to the present invention, a connection is provided to a computing unit for transmission and optional processing and/or storage of at least a selection of the recorded images and/or for controlling the system through the computing unit. Via such a computing unit, the system according to the present invention can be programmed, controlled, or adjusted in addition to or instead of the operating unit, e.g., for maintenance purposes, or the recorded images can be stored thereon in addition to or instead of the memory, or can also be processed, e.g., equalized, outside the system according to the present invention.

Below, an exemplary embodiment of the present invention shown in the FIGURE is described in more detail.

BRIEF DESCRIPTION OF THE DRAWING

FIG. 1 shows a schematic presentation of an example system in accordance with the present invention.

DETAILED DESCRIPTION OF EXAMPLE EMBODIMENTS

FIG. 1 shows a roughly schematic representation of a system 100 according to the present invention to be used by a user 101 in a vehicle indicated by a steering wheel 102, with which the user, as driver or as passenger, moves along a path through a landscape 103, past various scenes or objects, indicated here for example as a forest 104, a house 105, and a rainbow 106. System 100 situated in the vehicle includes a control unit 107, to which there is connected an external camera 109 as device 108 for recording images of scenes or objects 104, 105, 106, and further includes as acquisition device 111 for acquiring a behavior of user 101 an internal compartment camera 112, a microphone 113, and data glasses 114. In a modification, acquisition device 111 can include interior compartment camera 112, microphone 113, or data glasses 114 in various combinations. Optionally, further external cameras 110 are included in device 108 for recording images of scenes or objects 104, 105, 106. With external cameras 109, 110, various recording directions and image segments to be recorded can be acquired. A recording device 115 of external camera 109 is indicated as an example. Optionally, as external camera 109 an omnidirectional camera having an image segment of 360° is provided. A drive unit 116 is used for the orientation, controlled by control unit 107, of external cameras 109, 110 in the recording directions ascertained by control unit 107, and is accordingly also connected to control unit 107. Moreover, the following are connected to control unit 107: a memory 117 for storing the images recorded by external cameras 109, 110 or a selection thereof, a display unit 118 for displaying recording images or operating procedures for control unit 107, an operating unit 119, for example fashioned as a keyboard, for operating the system 100, a navigation unit 120 set up to ascertain a position and/or direction of movement of user 101, a transmission unit 121 for transmitting the acquired images or a selection thereof to or via a communication network, and a computing unit 122 for transmitting and optional processing or storage of the recorded images, or for controlling system 100 through computing unit 122. Here, navigation unit 120 includes an antenna 123 for receiving navigation signals, a navigation receiver 124, e.g., a GPS receiver, and a stage 125 for ascertaining the position and direction of movement of user 101 from the received navigation signals.

User 101, who, according to the representation of FIG. 1, is moving through landscape 103 in a vehicle, observes a scene of interest to him, e.g., rainbow 106. To do this, he turns his direction of view 126 away from his direction of movement along a route. His direction of view 126 is determined by interior compartment camera 112 and/or data glasses 114, also referred to as digital glasses. If a plurality of users 101 are present, their directions of view are also ascertained. For this purpose, interior compartment camera 112 acquires at least the face and eyes, and advantageously also hands, of user 101, or data glasses 114 acquire the position of the head and of the eyes using positional and/or directional sensors situated therein as well as eye cameras. The temporal curve of direction of view 126 is also ascertained. These data are evaluated in control unit 107, for which purpose, besides the duration and direction of the user directing of the view, in addition preferably a change in the pupil size is used as a measure of attentiveness, and the facial expression, indicating, e.g., surprise, anger, joy, etc., spoken expressions and unconscious interjections acquired by the microphone, and gestures also acquired by interior compartment camera 112, such as pointing gestures, can be used individually or in optional combination. These features of the behavior of user 101 are evaluated using means (i.e., an element) for recognizing facial expressions or gesture recognition, preferably using pattern recognition and speech recognition, and assumptions of particular desires are assigned. Thus, for example if direction of view 126 remains turned away from the movement of direction over a period of time that exceeds a specified boundary value, it is assumed that there is a desire to record an image of a scene situated in this direction, e.g. rainbow 106. For example, a pointing gesture of a hand of user 101 is preferably also assigned the assumption of this desire. Here, the individual features of the behavior of user 101 are weighted differently to form an assumption of a desire resulting from all features. A particularly strongly weighted criterion here is the turning away of the view of the driver from the direction of motion, i.e., from the route being traveled.

From these features and their weighting, the control unit ascertains a measure of the relevance of the observed scene. When there is a sufficient degree of relevance, from the determined direction of view the presence is inferred of a scene that is situated outside the vehicle and that is to be photographed. Via external cameras 109, 110, one or more images are then recorded, processed if necessary by the control unit, e.g., equalized, and stored in memory 117. The processing by control unit 107 advantageously also includes a selection of a relevant image segment, in particular if external camera 109 is an omnidirectional camera recording an image over 360°. Advantageously, in addition an image also having the ascertained measure for the relevance of the observed scene, the location, and the time of the recording, and the person who triggered the recording, is stored in linked fashion. The storing of the images further advantageously takes place optionally in memory 117 or in a central memory device, connected via transmission unit 121, situated outside system 100 according to the present invention, e.g. in a so-called "cloud."

In the depicted example, user 101 is driving on a country road, and to one side observes a rainbow, and repeatedly turns his gaze from the street to the scene. System 100 according to the present invention recognizes on the basis of the repeated turning away of the gaze, for example via interior compartment camera 112, that the user is dedicating his attention to this scene. Additional features, such as the facial expression of user 101, e.g., whether user 101 is surprised, may also be included in the evaluation. From the recognized directions of view of the individual glances over time, and the path traveled during this time, control unit 107 estimates the image segments, or scenes or objects, that are to be recorded and captured in the image, i.e. records an image. If the estimation yields a plurality of relevant scenes or objects, system 100 according to the present invention records a plurality of images, i.e., images of all relevant scenes or objects. In a further embodiment, system 100 according to the present invention, in particular control unit 107, is fashioned to carry out, on the basis of the features of the behavior of user 101 acquired for each image, an evaluation of the relevance of the individual images for user 101, i.e., from a combined assessment of all features of the behavior to infer the level of interest of user 101 in the relevant image, e.g., how pronounced the reaction of user 101 is to the perception of the scene or of the object. After the result of the evaluation of the relevance, control unit 107 can preferably select the most important images, display them to the user on display unit 118, store them in memory 117 or computing unit 122, send them via transmission unit 121 to a central memory, as emails, or to social networks, or also automatically delete them.

In further embodiments of system 100 according to the present invention, images from the entire surrounding environment are recorded if for example the direction of view of user 101 cannot be clearly acquired due to multiple irregular changes of this direction of view. Preferably, for this purpose external camera 109 is realized as an omnidirectional camera, or images recorded using a plurality of external cameras 109, 110 are combined in control unit 107 to form a preferably complete omnidirectional view, and the combination is stored. From this, the desired image segment can be selected later by user 101, e.g. via display unit 118 or computing unit 122. Images can be stored in a private user account accessible only by the user who triggered the recording of the images. Images can be displayed to the user on display unit 118, data glasses 114, or a head-up display. They can be blended into a representation of a map displayed for example on display unit 118 by navigation unit 120. Images can be evaluated with respect to their content by control unit 107 using pattern recognition, so that for example images of street signs, pedestrians, other vehicles, or the like can be sorted automatically according to the user configuration of the selection criteria, i.e., the reference sample. From the position and direction of view of the user and map data of navigation unit 120, control unit 107 can ascertain whether the scene in the direction of view is for example a place of sightseeing interest, and therefore preferably to be recorded, which can be included in the above evaluation of the relevance. In this way, external camera 109 can be oriented in a more purposive fashion. An automatic activation of system 100 is possible in that, from map data, navigation unit 120 recognizes when user 101 is moving past parts of the landscape worthy of attention, or places of sightseeing interest.

What is claimed is:

1. A system for creating at least one image of a scene and/or object, comprising:
    at least one device for recording the at least one image of the scene and/or object, which is of a surrounding of the at least one user;
    a device for acquiring a behavior of at least one user in viewing the scene and/or object, which is of the surrounding of the at least one user; and
    a control unit for evaluating the behavior of the at least one user and for obtaining therefrom at least one control signal for a controlling of the device, including a selection of a recording direction and of image segments or objects that are to be recorded, for recording the at least one image in accordance with the behavior of the at least one user;
    wherein the control unit is configured to evaluate at least one of the following features of the behavior of the at least one user: i) a pupil size or a temporal change in this pupil size of the at least one user, ii) a vocalization or speech expression of the at least one user, and iii) a gesture of the at least one user, and wherein the control unit is configured to evaluate a facial expression of the at least one user, the facial expressions excluding sleepiness, wherein a change of the at least one user's direction of view from a route to be followed to a differing direction results in a control signal for taking a picture of the scene viewed by the at least one user, and wherein the control unit is configured to evaluate a pupil size or a temporal change in this pupil size of the at least one user.

2. The system as recited in claim 1, wherein the device for acquiring the behavior of the at least one user includes at least one of: i) at least one optical acquisition device, ii) at least one acoustic acquisition device, and iii) at least one position acquisition device.

3. The system as recited in claim 1, wherein the control unit is configured to further evaluate a duration and a direction of a view of the at least one user.

4. The system as recited in claim 1, further comprising:
a memory device for storing at least a selection of the recorded images.

5. The system as recited in claim 1, further comprising:
a display unit for displaying at least a selection of the recorded images.

6. The system as recited in claim 1, further comprising:
an operating unit for operating the system by inputting operating commands to the control unit.

7. The system as recited in claim 1, wherein the system is connected to a navigation unit that is set up to ascertain a position or direction of movement of the at least one user, and to transmit the ascertained position or direction of movement to the control unit for the selection of an image to be recorded and/or for linkage to at least a selection of the recorded images.

8. The system as recited in claim 1, wherein the system is situated in a vehicle, and wherein the at least one user includes at least one of a driver of the vehicle and a passenger of the vehicle.

9. The system as recited in claim 1, wherein the system is connected to a transmission unit for transmitting at least a selection of the acquired images to or via a communication network.

10. The system as recited in claim 1, wherein the system is connected to a computing unit for at least one of: transmission, optional processing, storing of at least a selection of the recorded images, and controlling the system through the computing unit.

11. The system as recited in claim 1, wherein the scene and/or object is external to the vehicle.

12. The system as recited in claim 1, wherein the device for acquiring the behavior of the at least one user includes at least one of: i) at least one optical acquisition device, ii) at least one acoustic acquisition device, and iii) at least one position acquisition device, and wherein the control unit is configured to evaluate at least the following features of the behavior of the at least one user: i) a duration and a direction of a view of the at least one user, ii) a facial expression of the at least one user, iii) a vocalization or speech expression of the at least one user, and iv) a gesture of the at least one user.

13. The system as recited in claim 1, further comprising:
a memory device for storing at least a selection of the recorded images;
a display unit for displaying at least a selection of the recorded images; and
an operating unit for operating the system by inputting operating commands to the control unit.

14. The system as recited in claim 13, wherein the system is connected to a navigation unit that is set up to ascertain a position or direction of movement of the at least one user, and to transmit the ascertained position or direction of movement to the control unit for the selection of an image to be recorded and/or for linkage to at least a selection of the recorded images.

15. The system as recited in claim 13, wherein the system is situated in a vehicle, and wherein the at least one user includes at least one of a driver of the vehicle and a passenger of the vehicle, and wherein the system is connected to a transmission unit for transmitting at least a selection of the acquired images to or via a communication network.

16. The system as recited in claim 13, wherein the system is connected to a computing unit for at least one of: transmission, optional processing, storing of at least a selection of the recorded images, and controlling the system through the computing unit.

* * * * *